(12) United States Patent
Langkafel et al.

(10) Patent No.: US 7,571,390 B2
(45) Date of Patent: Aug. 4, 2009

(54) SYSTEM AND METHOD FOR PROJECTING TRANSFORMATIONS OF OBJECT TREES

(75) Inventors: Dirk Langkafel, Erlangen (DE); Elmar Thurner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 546 days.

(21) Appl. No.: 10/499,735

(22) PCT Filed: Nov. 28, 2002

(86) PCT No.: PCT/DE02/04375

§ 371 (c)(1),
(2), (4) Date: Jun. 8, 2004

(87) PCT Pub. No.: WO03/050716

PCT Pub. Date: Jun. 19, 2003

(65) Prior Publication Data

US 2005/0108265 A1    May 19, 2005

(30) Foreign Application Priority Data

Dec. 12, 2001 (DE) ................. 101 61 111

(51) Int. Cl.
*G06F 3/00* (2006.01)
*G06F 3/048* (2006.01)
*G06F 9/44* (2006.01)

(52) U.S. Cl. ............ 715/763; 715/513; 715/805; 715/810; 715/853; 717/109

(58) Field of Classification Search .............. 715/805, 715/763, 513, 810, 853; 717/109
See application file for complete search history.

(56) References Cited

U.S. PATENT DOCUMENTS

| | | | | |
|---|---|---|---|---|
| 5,557,798 A | * | 9/1996 | Skeen et al. | 705/35 |
| 5,724,532 A | * | 3/1998 | Thomson | 719/329 |
| 5,890,155 A | * | 3/1999 | Steinman et al. | 707/9 |
| 5,909,368 A | * | 6/1999 | Nixon et al. | 700/2 |
| 5,995,916 A | * | 11/1999 | Nixon et al. | 702/182 |
| 6,029,181 A | * | 2/2000 | Milakovich et al. | 715/209 |
| 6,032,208 A | * | 2/2000 | Nixon et al. | 710/64 |
| 6,098,116 A | * | 8/2000 | Nixon et al. | 710/8 |
| 6,104,963 A | * | 8/2000 | Cebasek et al. | 700/86 |
| 6,115,646 A | * | 9/2000 | Fiszman et al. | 700/181 |
| 6,119,125 A | * | 9/2000 | Gloudeman et al. | 707/103 R |
| 6,138,143 A | * | 10/2000 | Gigliotti et al. | 709/203 |
| 6,141,595 A | * | 10/2000 | Gloudeman et al. | 700/83 |

(Continued)

OTHER PUBLICATIONS

Bücher über XSL, [online], Aug. 17, 2004 [retrieved on Sep. 9, 2004]. Retrieved from the Internet: <URL:http:www.weblehre.de/verfahren/book/xsl.htm>. p. 1, XP-002292877.

(Continued)

*Primary Examiner*—Sy D Luu
*Assistant Examiner*—Linh K Pham

(57) ABSTRACT

A system and method for projecting the transformation of object trees, especially in MES systems, wherein the course object tree and target object tree are represented in a common meta-object model of a software system, especially a framework. The source object tree is transformed into the target object tree by adjustment. Transformation occurs directly in the object of the meta-object model, thereby enabling communication between connected applications by means of pure data exchange.

12 Claims, 6 Drawing Sheets

U.S. PATENT DOCUMENTS

| | | | |
|---|---|---|---|
| 6,167,316 A * | 12/2000 | Gloudeman et al. | 700/2 |
| 6,195,591 B1 * | 2/2001 | Nixon et al. | 700/83 |
| 6,208,345 B1 * | 3/2001 | Sheard et al. | 715/853 |
| 6,240,326 B1 * | 5/2001 | Gloudeman et al. | 700/83 |
| 6,256,678 B1 * | 7/2001 | Traughber et al. | 719/310 |
| 6,336,085 B1 * | 1/2002 | Ueda et al. | 703/9 |
| 6,434,435 B1 * | 8/2002 | Tubel et al. | 700/30 |
| 6,678,668 B2 * | 1/2004 | Fisher et al. | 706/14 |
| 6,687,761 B1 * | 2/2004 | Collins et al. | 719/315 |
| 6,742,054 B1 * | 5/2004 | Upton, IV | 710/6 |
| 6,789,252 B1 * | 9/2004 | Burke et al. | 717/100 |
| 6,823,495 B1 * | 11/2004 | Vedula et al. | 715/805 |
| 6,957,110 B2 * | 10/2005 | Wewalaarachchi et al. | 700/86 |
| 7,043,687 B2 | 5/2006 | Knauss et al. | |
| 7,103,838 B1 * | 9/2006 | Krishnamurthy et al. | 715/202 |
| 7,110,835 B2 * | 9/2006 | Blevins et al. | 700/83 |
| 7,159,185 B1 * | 1/2007 | Vedula et al. | 715/763 |
| 7,174,230 B2 * | 2/2007 | Arackaparambil et al. | 700/96 |
| 7,191,397 B2 * | 3/2007 | Brooke et al. | 715/239 |
| 7,237,207 B2 * | 6/2007 | Panditharadhya et al. | 715/805 |
| 7,356,480 B2 * | 4/2008 | Cohen | 705/7 |
| 7,409,679 B2 * | 8/2008 | Chedgey et al. | 717/144 |
| 2002/0054155 A1 * | 5/2002 | Churchill et al. | 345/826 |
| 2002/0156814 A1 * | 10/2002 | Ho | 707/514 |
| 2003/0006999 A1 * | 1/2003 | Carlson et al. | 345/713 |
| 2003/0070143 A1 * | 4/2003 | Maslov | 715/513 |
| 2003/0197733 A1 * | 10/2003 | Beauchamp et al. | 345/764 |
| 2004/0024625 A1 * | 2/2004 | Cohen | 705/7 |
| 2006/0277289 A1 * | 12/2006 | Bayliss et al. | 709/223 |

OTHER PUBLICATIONS

Kurt Cagle, Michael Corning, Jason Diamond, Teun Duynstee, Oli Gauti Gudmundsson, Michael Mason, Jonathan Pinnock, Paul Spencer, Jeff Tang, Andrew Watt, Jirka Jirat, Paul Tchistopolskii and Jeni Tennison, "Professional XSL", WROX Press Ltd, Blrmingham, UK, Apr. 2001, pp. 8-21, XP002292878.

Microsoft, "Customizing Visio 2000 Software", [online], Apr. 2000 [retrieved on Aug. 17, 2004]. Retrieved from the Internet: <URL:http://www.microsoft.com/technet/prodtechnol/visio/visio2000/maintain/custom.mspx>. pp. 1-13, XP002292855.

Dirk Kozian, "Transparenz über die Abläufe schaffen", Elektrotechnik für die Automatisierung 11, Nov. 17, 1999, pp. 66, 68, 69.

Ulrich Lindner, "Massive Wiederverwendung: Konzepte, Techniken und Organisation", Objekt Spektrum Jan. 1996, pp. 10-17.

Alexander Jung, "XML—Schlüsseltechnologie für Softwarearchitekturen", Objekt spectrum Jan. 2001, pp. 71-74.

"Konfigurieren statt Programmieren—Die Empfehlungen des ZVEI-Arbeitskreises Systemaspekte, 1. Teil", Elektronik Aug. 1994, pp. 112-117.

eXcelon Corporation, "Stylus Studio and the Excelon Platform", Burlington, MA, USA, 2001, pp. 1-4, Ad.

eXcelon Corporation, "eXcelon Unveils Portal Server 3.0; Major New Release of Self-service Application Platform Includes New Development Platform and Single-point Administration", Feb. 27, 2001, pp. 1-5.

* cited by examiner

SYSTEM AND METHOD FOR PROJECTING TRANSFORMATIONS OF OBJECT TREES

CROSS REFERENCE TO RELATED APPLICATIONS

This application is the U.S. National Stage of International Application No. PCT/DE02/04375, filed Nov. 28, 2002 and claims the benefit thereof. The International Application claims the benefits of German application No. 10161111.0 filed Dec. 12, 2001, both of the applications are incorporated by reference herein in their entirety.

FIELD OF INVENTION

The invention relates to a system and a method for projecting transformations of object trees, wherein the source and target object trees are represented in a common meta-object model of a software system and wherein the software system is stored on at least one computer unit.

The invention further relates to a corresponding computer program, a computer program product and a data processing device.

BACKGROUND OF INVENTION

When heterogeneous applications, e.g. MES applications, are interconnected in a software system, the objects and/or object trees of the respective applications are mostly represented in different ways in the meta model of the software system, even if the objects and/or object trees are semantically consistent. These differences in representation make communication between the applications more difficult.

"Software für die Automatisierung—Transparenz über die Abläufe schaffen" ("Software for automation—creating transparency across processes"), an article by Dirk Kozian in "Elektronik für die Automatisierung 11", Nov. 17, 1999, discloses the use of what are termed "Manufacturing Execution Systems" (MES) for automating production and manufacturing processes. These systems integrate the automation level (Controls) with the ERP systems (ERP: Enterprise Resource Planning) of the corporate executive management level. Manufacturing Execution systems are systems which provide, for example, information for optimizing production processes. On the one hand, the Manufacturing Execution systems must supplement the rough planning data of the ERP systems with equipment-specific and up-to-date fine planning data and forward this data accordingly to the underlying automation level; on the other hand, they are required to extract production-relevant information from the automation level and report it further to the corporate executive management level. MES systems therefore fulfill the role of providing a vertical integration between the corporate executive management level and the automation level. Typical individual tasks of MES systems are enterprise asset management, maintenance management, information management, scheduling, dispatching, and trace & track. These tasks are executed in each case by the respective MES components or MES applications.

Due to the technical software- and data-related heterogeneity of the MES applications, however, they can be integrated into a common system or project only with very great difficulty and the data exchange between these applications can be implemented only with extra investment of time and effort.

"Massive Wiederverwendung: Konzepte, Techniken und Organisation" ("Massive reuse: concepts, techniques and organization"), an article by Ulrich Lindner in OBJEKTspektrum 1/96, pp. 10-17, discloses how software components may be integrated into a software system by means of what are termed adapters or by wrapping. The aim here is to increase the reusability of software components.

"XML—Schlüsseltechnologie für Softwarearchitekturen" ("XML—key technology for software architectures"), an article by Alexander Jung in OBJEKTspektrum 1/2001, pp. 71-74, discloses how XML (extensible Markup Language) may be used for data exchange between dissimilar systems and at the same time for performing transformations. A standard procedure for transforming XML documents is defined in the context of the XML family: XSL transformations (XSL stands for Extensible Stylesheet Language). By means of XSL transformations it is also possible to describe tree transformations, but only if the objects of the trees are present in XML format and the respective XML format is known to a user. If a user wants to perform a transformation of an object tree, he or she requires the associated representation of the objects in XML format and must define the transformation at the XML level.

This requires time and effort, for the user must first obtain the corresponding XML formats of the objects.

"Konfigurieren statt Programmieren—Die Empfehlungen of the ZVEI-Arbeitskreises Systemaspekte, 1. Teil" ("Configuring instead of programming—the recommendations of the ZVEI System Aspects Working Group", Part 1), an article in Elektronik 8/1994, pp. 112-117, describes how the software automation systems may be configured or "projected". No configurable systems for cross-sector problems are present, however.

SUMMARY OF INVENTION

The object of the underlying invention is to provide a system and a method for projecting transformations of object trees, wherein it is convenient and easy for the user to define the transformations.

According to the invention the proposed object for a system for projecting transformations of object trees is achieved by the features recited in claim 1. The transformation of the objects or object trees takes place here in the domain environment of the user; in other words, the user can abstract from the underlying format of the objects. A further advantage is that as a result of the transformation object structures are converted into a form which is intelligible in each case to recipients (e.g. other applications) of these object structures. That is to say, the situation often occurs that in a common meta-object model semantically identical objects (e.g. a production order) are represented differently. As a result of the transformations, uniform representations are also created for objects which are semantically identical. This enables communication to take place between different applications via a pure data exchange. A user can perform the projecting of the transformations very conveniently by graphically connecting (linking) the symbols. As a result of the linking further rules are also generated which can be processed further or reused. The graphical interface used makes the transformations and the rules used transparent to a user.

A first advantageous embodiment of the present invention for a system consists in the transformation being executable in the basic domain for a user. If the transformation is performed directly on the domain level of the user, the user can abstract from the internal formats of the objects or object trees. This increases the efficiency of a user since he or she resides in their familiar world (familiar nomenclature, familiar objects, etc.) during the development of solutions. A user therefore does not have to transform the objects to be transformed at the level of their internal format and subsequently translate them back again into the domain environment.

A further advantageous embodiment of the present invention for a system is that the rules are represented as objects of the software system. As a result the objects appear to a user as part of the software system. A user can also handle the rules like objects, e.g. graphically link them.

A further advantageous embodiment of the present invention for a system is that the nodes and/or operators and/or rules are positioned and connected by means of input aids via drag&drop. As a results users are supported in their working practices and their efficiency is increased.

A further advantageous embodiment of the present invention for a system is that further transformation operators and/or rules can be defined by a user. This increases the flexibility for a user and a user can define rules which are appropriate to the underlying structures and problems.

A further advantageous embodiment of the present invention for a system is that the software system is implemented by means of at least one framework program. This provides the advantages of a framework. A framework defines the architecture of a family of software systems, provides the basic building blocks for creating these systems and specifies the way they interact. Frameworks save on development time and development costs.

A further advantageous embodiment of the present invention for a system is that source and target object tree are predefined by the object models of coupled adapters. Adapters are one abstraction stage higher than wrappers. They offer a uniform view of coupled applications. An adapter provides functionality required to start, operate the component to be coupled, etc. An adapter corresponds, in the language of the design patterns, to a "facade". A wrapper, on the other hand, maps the API (Application Programmable Interface) of an other-vendor component (e.g. an MES application of a third-party provider) into the object model of a software system. Thus, for example, a method of the API of the third-party component is converted into a method of the software system or an integer data type of the API of the third-party component is converted into an integer data type of the software system, etc. By means of adapters the objects of the applications to be integrated are mapped into the meta-object model of the software system and represented as source or target object tree in the meta-object model. If the adapters now specify the structure of these trees, a subsequent transformation of source to target object tree can be performed very easily and possibly even be automated.

According to the invention the posed object for a method for projecting transformations of object trees is achieved by the features recited in claim 8. In this case the transformation of the objects or object trees takes place in the domain environment of the user, i.e. the user can abstract from the underlying format of the objects. A further advantage is that as a result of the transformation object structures are changed into a form which is intelligible in each case to recipients (e.g. other applications) of these object structures. That is to say, the situation often occurs that in a common meta-object model semantically identical objects (e.g. a production order) are represented differently. As a result of the transformations uniform representations are also created for objects which are semantically identical. This enables communication to take place between different applications via a pure data exchange. A user can initiate the projecting of the transformations very conveniently by graphically connecting (linking) the symbols. As a result of the linking further rules are also generated which can be processed further or reused. The graphical interface used makes the transformations and the rules used transparent to a user.

A first advantageous embodiment of the present invention for a method consists in the transformation being executable in the basic domain for a user. If the transformation is performed directly on the domain level of the user, the user can abstract from the internal formats of the objects or object trees. This increases the efficiency of a user since he or she resides in their familiar world (familiar nomenclature, familiar objects, etc.) during the development of solutions. A user therefore does not have to transform the objects to be transformed at the level of their internal format and subsequently translate them back again into the domain environment.

A further advantageous embodiment of the present invention for a method is that the rules are represented as objects of the software system. As a result the objects appear to a user as part of the software system. A user can also handle the rules like objects, e.g. graphically link them.

A further advantageous embodiment of the present invention for a method is that the nodes and/or operators and/or rules are positioned and connected by means of input aids via drag&drop. As a result users are supported in their working practices and their efficiency is increased.

A further advantageous embodiment of the present invention for a method is that further transformation operators and/or rules are defined by a user. This increases the flexibility for a user and a user can define rules which are appropriate to the underlying structures and problems.

A further advantageous embodiment of the present invention for a method is that the software system is implemented by means of at least one framework program. This provides the advantages of a framework. A framework defines the architecture of a family of software systems, provides the basic building blocks for creating these systems and specifies the way they interact. Frameworks save on development time and development costs.

A further advantageous embodiment of the present invention for a method is that source and target object tree are predefined by the object models of coupled adapters. Adapters are one abstraction stage higher than wrappers. They offer a uniform view of coupled applications. An adapter provides functionality required to start, operate the component to be coupled, etc. An adapter corresponds, in the language of the design patterns, to a "facade". A wrapper, on the other hand, maps the API (Application Programmable Interface) of an other-vendor component (e.g. an MES application of a third-party provider) into the object model of a software system. Thus, for example, a method of the API of the third-party component is converted into a method of the software system or an integer data type of the API of the third-party component is converted into an integer data type of the software system, etc. By means of adapters the objects of the applications to be integrated are mapped into the meta-object model of the software system and represented as source or target object tree in the meta-object model. If the adapters now specify the structure of these trees, a subsequent transformation of source to target object tree can be performed very easily and possibly even be automated.

A further advantageous embodiment of the present invention is that the method according to the invention is implemented by means of a computer program. As a result, possible modifications or adaptations can be easily carried out.

A further advantageous embodiment of the present invention is that the computer program for the method according to the invention is stored on a data medium. As a result the method is easy to handle in terms of logistics and distribution.

A further advantageous embodiment of the present invention is that the computer program for the method according to the invention is installed on a data processing device. As a result performance is increased.

BRIEF DESCRIPTION OF THE DRAWINGS

Further advantages and details of the invention will emerge with reference to the now following description of advantageous exemplary embodiments and in connection with the figures. In so far as elements with identical functionalities are described in different figures, these are identified by the same reference characters. The figures show.

DETAILED DESCRIPTION OF INVENTION

Figure 1:
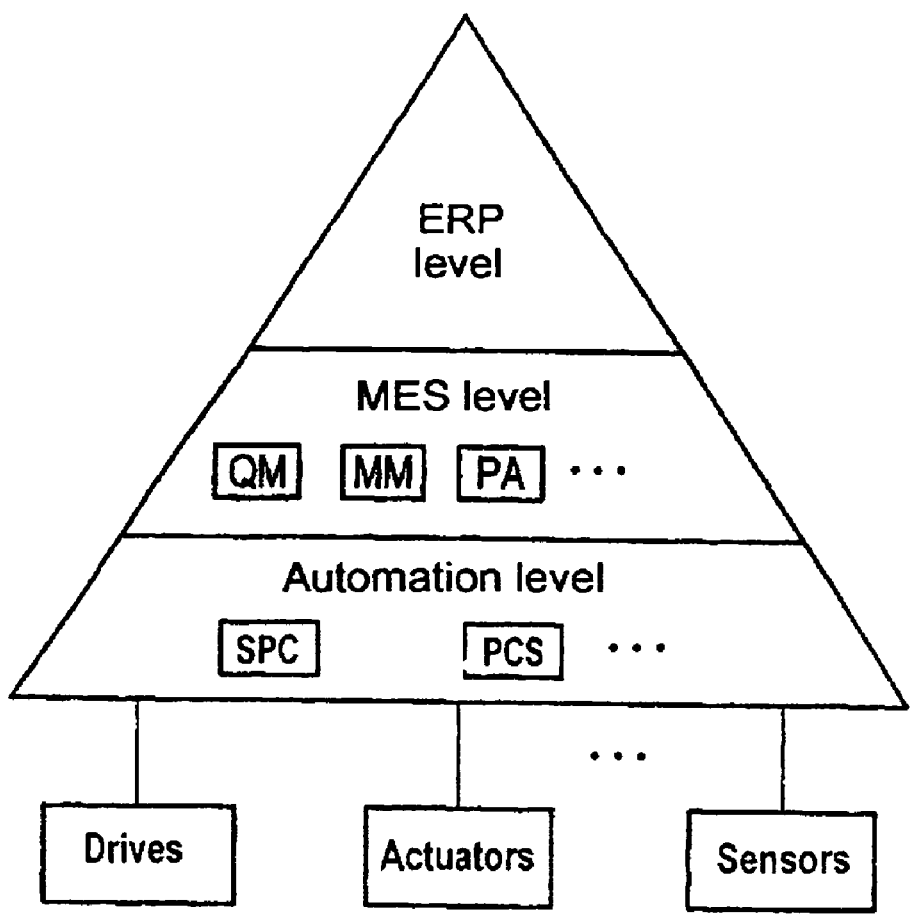
FIG. 1 in an overview representation, the "enterprise pyramid" comprising three control levels, FIG. 2 an exemplary overview diagram including software and hardware units for MES solutions, FIG. 3 the central position of the framework program coupling the software applications, FIG. 4 an example of the transformation of objects, FIG. 5 an example of the transformation of objects with the aid of mathematical objects, FIG. 6 an example of the projecting of a transformation, FIG. 7 a schematic of the structure of an adapter, and FIG. 8 a "component" as a meta-object model in UML notation.

The illustration according to FIG. 1 shows in an overview representation the three control levels, as they are typically to be found in a producing or manufacturing organization. The pyramid shape is intended to express that a concentration of the information takes place from the bottom toward the top. The highest level is the ERP (Enterprise Resource Planning) level. It is at this corporate executive management level that the operational and sales and marketing tasks are typically carried out in an organization (e.g. financial management, sales, human resources, reporting). Logistical tasks spanning production systems (e.g. order and materials management) are also performed at this level, however. The SAP R/3 system is an ERP system which is very commonly used at the corporate executive management level.

The lowest level of the pyramid is The automation level (Controls). Stored program controls (SPCs) are typically deployed at this level in combination with visualization and process control systems (PCSs). The drives, actuators and sensors of the production and/or manufacturing equipment are directly connected to the systems of this level.

The connecting element between the ERP level and the automation level is formed by the MES level. The applications of the MES level thus ensure vertical integration between the ERP level and the automation level. On the one hand, the MES applications must supplement the rough planning data of the ERP systems with production system-specific fine planning data and forward this information to the systems of the automation level. On the other hand, the MES applications are responsible for recording and editing production-relevant data of the automation level and forwarding it to the ERP level (corporate executive management level).

Typical MES applications include quality management (QM), maintenance management (MM), performance analysis (PA), process management, labor management, and asset management. Three dots are used at each level in FIG. 1 to indicate that a level may also contain further elements (applications, systems, etc.).

MES systems and ERP systems usually contain what is known as a runtime system for scheduling the time of execution of the components involved (subcomponents, modules, tasks, processes of the operating system, etc.), as well as what is known as an engineering system for producing and editing programs which are provided for execution in the runtime system.

Figure 2:
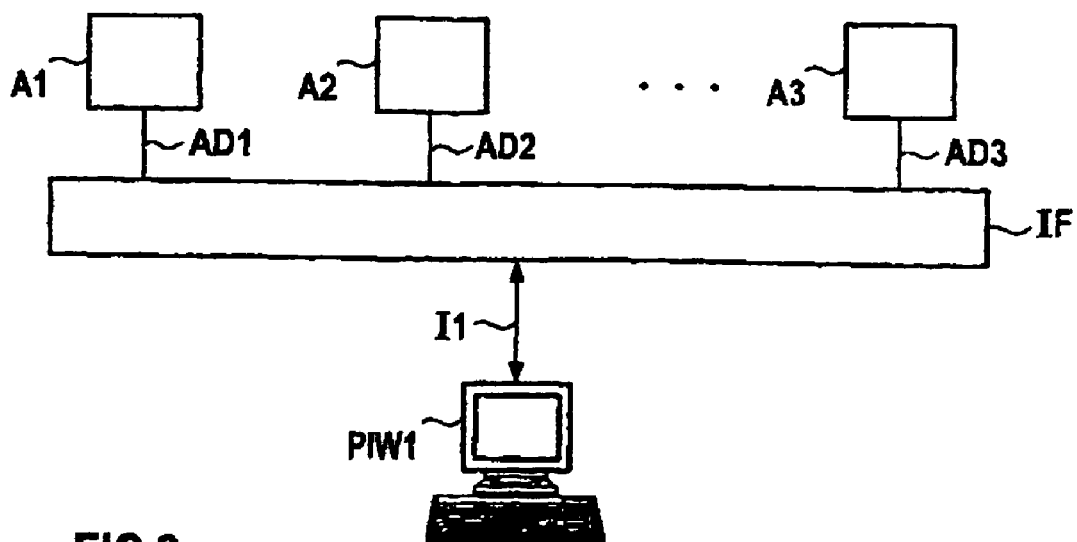

The illustration according to FIG. 2 shows an exemplary overview diagram including software and hardware units for MES solutions. The individual MES applications A1 to A3 are connected via adapters AD1 to AD3 to a framework program IF. A user workstation PIW1 is linked to the framework program IF via a bidirectional information path I1 and can therefore administer and monitor the attached or integrated MES applications. The user workstation PIW1 typically consists of a display device (monitor, display, etc.), a data processing system (e.g. PC) with processor and storage devices, and input units (keyboard, mouse, etc.). The MES applications A1 to A3 and the framework program IF can run on dedicated data processing units or processors, but it is also possible that they run on the data processing unit of the PIW1.

The respective MES applications A1 to A3 are connected to the framework program IF via adapters AD1 to AD3. The adapters are therefore the linkage components between the framework program IF and the applications. Thus, inherently heterogeneous applications can also be interconnected via the adapters, and as a result of the integration with the framework program IF it is possible for the applications to communicate between themselves and to engage in data exchange. The adapters are software modules which establish connections to different applications. In typical integration scenarios these are integrations with systems from the MES, ERP, SCADA or Controls environments. An adapter provides the functionality required to start and operate a component to be coupled, etc.

An adapter permits access to data and functions of the application to be attached, makes certain runtime data available and permits engineering information to be loaded from the application to be coupled. Adapters can differ in terms of their structure and scope. Thus, for example, adapters can be permanently programmed or they can be configured or modeled. Adapters can also differ in terms of the possibilities for access to the application to be coupled. Thus, for example, adapters may permit only a data-related access, though it is also possible for adapters to allow access to higher-value business processes. At startup time the adapters are loaded with the stored models and status information. At runtime a check is then made to determine whether and how the different integrated applications fit together. Via a visualization and/or monitoring component it is possible to interrogate the status of an adapter and present it (also graphically) on the user workstation PIW1. By means of adapters both the system and the user receive a standardized and consistent view onto applications (depending on which abstraction level is present in the adapters).

A further means of integrating software components is to use wrappers. A wrapper maps the API (Application Programmable Interface) of a third-party component (e.g. an MES application) into the object model of the framework program. Thus, for example, a method of the API of the third-party component is transformed into a method of the framework program or a integer data type of the API of the third-party component is transformed into an integer data type of the framework program.

In addition to MES applications, applications from the corporate executive management level (Enterprise Resource Planning level) and from the automation level (Controls level) can also be integrated via the framework program IF and monitored and/or administered via the workstation PIW1 (the acronym PIW stands for Personalized Industrial Workplace). The framework program IF thus forms an integration platform for the whole of the industrial sector. Different applications from the corporate executive management level, the MES level and the automation level can be integrated easily and economically by the framework program IF with the aid of adapters and/or wrappers. The framework program IF is therefore to be regarded as a middleware platform and as a manufacturing application integration tool. Via the workstation PIW1, a user (e.g. the system operator) can view the respective statuses of the applications to be monitored and can also access data and methods of the applications. And furthermore by means of this access the user can also put applications in connection with one another.

The framework program IF therefore enables, on the one hand, a vertical integration of applications from different levels of an organization to be achieved and, on the other hand, permits a horizontal integration of applications of the MES level.

The workstation PIW1 represents "one window to the world" for a user at the front end of MES applications or other applications from the organization. In other words, the workstation permits integrated access to different, even heterogeneous applications in the organization via a common standardized interface. The user of the workstation PIW1 can therefore monitor and administer all the integrated MES or other applications from this one workstation. This workstation can be linked to the applications via the Internet, the intranet, LAN (Local Area Network) or other possible connection means. It is also possible to configure this workstation as a mobile station, e.g. as a mobile terminal device (PDA, cellphone). This mobility would result in even further advantages for a user.

Figure 3:
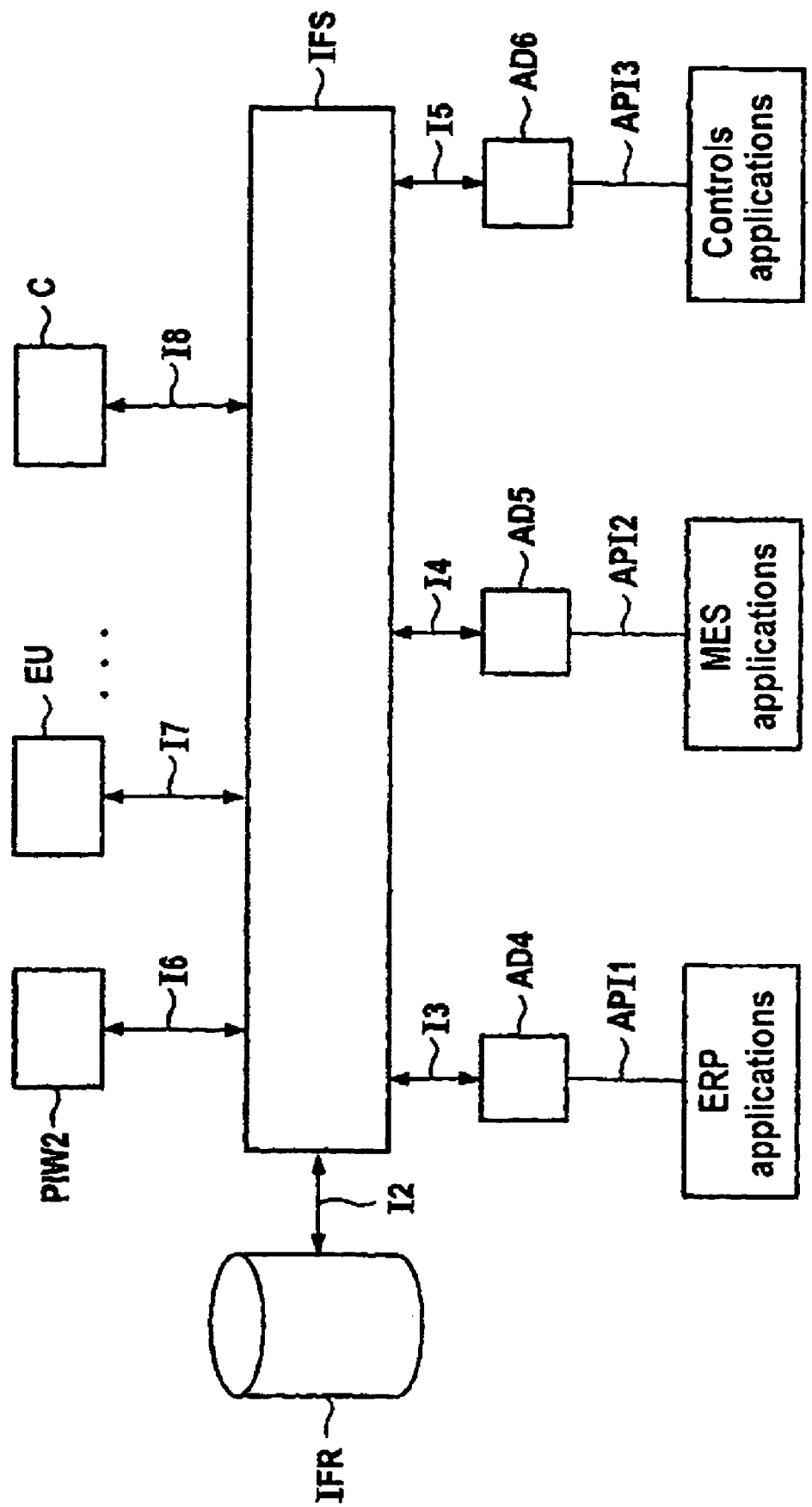

The illustration according to FIG. 3 shows the central position of the framework program linking together the software applications. Choosing a client/server architecture is appropriate for implementing the system or method according to the invention. In this case the framework program (IF; FIG. 2) can be implemented on a single server or on multiple arbitrary servers which can be distributed over an IT landscape. FIG. 3 shows that the framework program (IF; FIG. 2) resides on a server IFS (Industrial Framework Server). Attached to this central server IFS by means of the bidirectional information paths I2-I8 are the clients. The clients include, on the one hand, the applications from the ERP, the MES and the automation level. These applications are shown at the lower edge of the diagram in FIG. 3. These applications are connected to the framework program (IF; FIG. 2) and hence to the server IFS via the adapters AD4-AD6. The adapters AD4-AD6 are connected to the applications via API interfaces API1-API3 (API stands for Application Programmable Interface).

An Application Programmable Interface represents an interface having a set of commands. APIs are also used during the conversion of parameter lists from one format into another format and during the interpretation of the arguments in one or both directions. The APIs are, as it were, the glue between the applications and the adapters. The link between the adapters AD4-AD6 and the framework program (IF; FIG. 2) (represented in FIG. 3 by the bidirectional information paths I3-I5) is established via suitable data formats (e.g. XML), suitable protocols (XOP, OPC, etc.) and suitable transport mechanisms (e.g. DCOM or MSMQ). HTTP (Hyper Text Transfer Protocol) can also be used here. The SOAP protocol (Simple Object Access Protocol) which is based on XML (extensible Markup Language) can also be used for the integration of the adapters AD4-AD6 with the framework program (IF; FIG. 2) or the associated server IFS. Clients or applications which support ActiveX documents or calls can be integrated particularly advantageously into the framework program (IF; FIG. 2) or the server IFS. The connection of the applications to the framework program can be implemented not only with adapters but also by means of wrappers or other integration mechanisms.

The repository IFR (Industrial Framework Repository) can be connected to the server IFS as a further client. In FIG. 3, the connection is represented by the bidirectional information path I2. The repository IFR is used to hold data in a secure and persistent state. This data can be accessed via method calls. The repository serves to store objects, methods and runtime data, among other information.

Further clients of the server IFS are shown in the top half of the diagram. The personalized industrial workplace PIW2 and a possibly present engineering environment EU are clients of the server IFS. The personalized industrial workplace PIW2 is connected to the framework program (IF; FIG. 2) or to the server by means of the bidirectional information path I6, while the engineering environment EU is similarly connected by means of the bidirectional information path I7. The three dots are intended to indicate that further clients can be attached to the server IFS. Moreover, FIG. 3 shows that a further client C, connected by means of the information path I8, is also attached to the server IFS.

The clients IFR, PIW2, EU, C are connected accordingly via APIs or via common data formats (e.g. XML), common protocols (XOP, OPC, etc.) and common transport mechanisms (e.g. DCOM, HTTP or MSMQ).

The adapters AD4-AD6 used enable access to data and also to methods of the individual applications which connect them to the framework program (IF; FIG. 2). These adapters are very flexible and not tied to individual special protocols or special transport mechanisms. If the adapters are deployed in a runtime environment, then they are configured in such a way that it is ensured that certain required data from an application is present at the right time in the server environment. This can be achieved, as already indicated, by way of different protocols and transport mechanisms. A plurality of adapters, which can also possess small server characteristics (such as, for example, the execution of workflows, the provision of different communication facilities, . . . ), can be located in a runtime environment. These adapters can run on the respective application computer. However, they do not necessarily have to run on just one machine, but can also be distributed.

Software applications, in particular MES (Manufacturing Execution System) applications, are often present in a heterogeneous form, e.g. they can possess different data formats or object models or they are implemented in different programming languages. The system or method according to the invention enables heterogeneous applications of this type to be integrated with the aid of a framework program. The communication between these applications takes place on the basis of means of communication such as, for example, HTTP, DCOM, MSMQ, etc. However, the communication, i.e. the data exchange between the applications, is independent of these means of communication, i.e. the applications can abstract from the application means.

Figure 4:
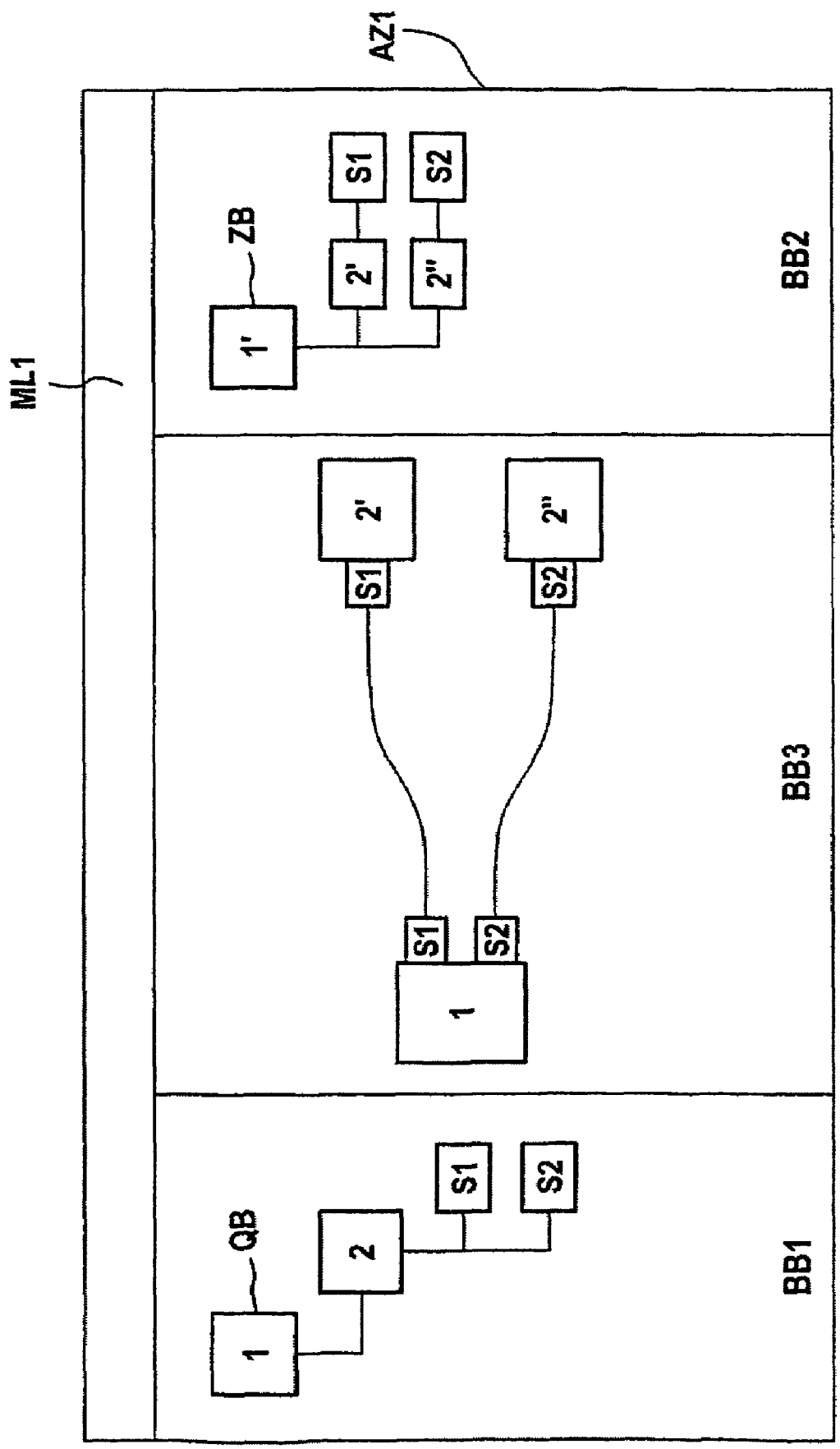

The illustration according to FIG. 4 depicts an example of the transformation of objects or object trees. Semantically identical objects may be represented entirely differently in a common meta-object model. In order to enable communication via pure data exchange it is necessary for the object structures to be exchanged to be converted into a form which is intelligible to the respective recipient. The diagram according to FIG. 4 shows in schematic form the interface of a projecting environment for the transformation of objects or object trees having a display device AZ1. The object trees shown in the screen areas BB1 and BB2 constitute objects (e.g. a production order) which are semantically identical, but which are represented differently. The source tree QB consists of a root 1 and, located thereunder, an element 2 which in turn possesses S1 and S2 as sub-elements. The target tree ZB possesses 1' as its root and 2' and 2" as elements attached thereunder. Element 2' is connected to element S1, and element 2" to element S2. The tree representations QB and ZB belong to applications (e.g. MES applications) which have been mapped via adapters into the meta model of the underlying software system (e.g. framework). Since the two tree structures, although representing semantically identical objects, are represented in a different form in the meta-object model, communication between the applications to which they belong is not yet possible effectively in this form. Effective communication is made possible by the mapping of one object tree onto the other. In the diagram according to FIG. 4, the source tree QB is transformed into the target tree ZB. The way in which this transformation takes place is shown in the screen area BB3. In this scheme the elements S1 and S2 represent objects (e.g. variables) which have the same meaning in the two trees QB and ZB. In the screen area BB3 it is shown how a transformation can take place which expresses that the objects S1 and S2 of the source tree QB and of the target tree ZB are semantically related. As a further screen area, the display device AZ1 can include a menu bar ML1 on which there are represented (e.g. by means of buttons) functions which a user can use for the transformation.

A monitor or a display is typically used as the display device. A user can control and activate the elements of the display device via input aids, e.g. a mouse or keyboard. The display device AZ1 can also include further screen areas. Thus, it is also conceivable, for example, that the screen area BB3 is further subdivided, or alternatively further menu bars ML1 may also be present. Once defined by the user, transformations can be stored and reused for subsequent applications. A user can also define rules in order to perform these transformations. These rules can also be stored by a user and reused for subsequent transformations. It is also conceivable that a rule becomes part of the meta-object model of the underlying software system and is then available to a user as an object. The rule objects referred to are generated automatically during the definition of a transformation. Mathematical functions (addition, subtraction, sine, cosine, etc.), but also timers or other adapters (e.g. Excel), can be used for defining transformations. The transformations and rules can be produced very easily using drag&drop mechanisms. As a result of the above described transformation, two semantic representations (e.g. object trees), which were introduced into the meta-object model by means of the adaptation, are converted into one another. This makes it very easy for the adapted applications (e.g. different MES applications) to communicate with one another. With the transformation described, the objects or object trees are mapped directly onto one another and not the representations of these objects in any format structures. The transformation can therefore take place in the user's domain environment, and a user can abstract from the internal representation of the objects, i.e. from the internal formats. The projecting or engineering environment described here can be implemented, for example, as a client in a framework or in the software system. However, it is also possible for this environment to be implemented on a standalone PC.

Figure 5:
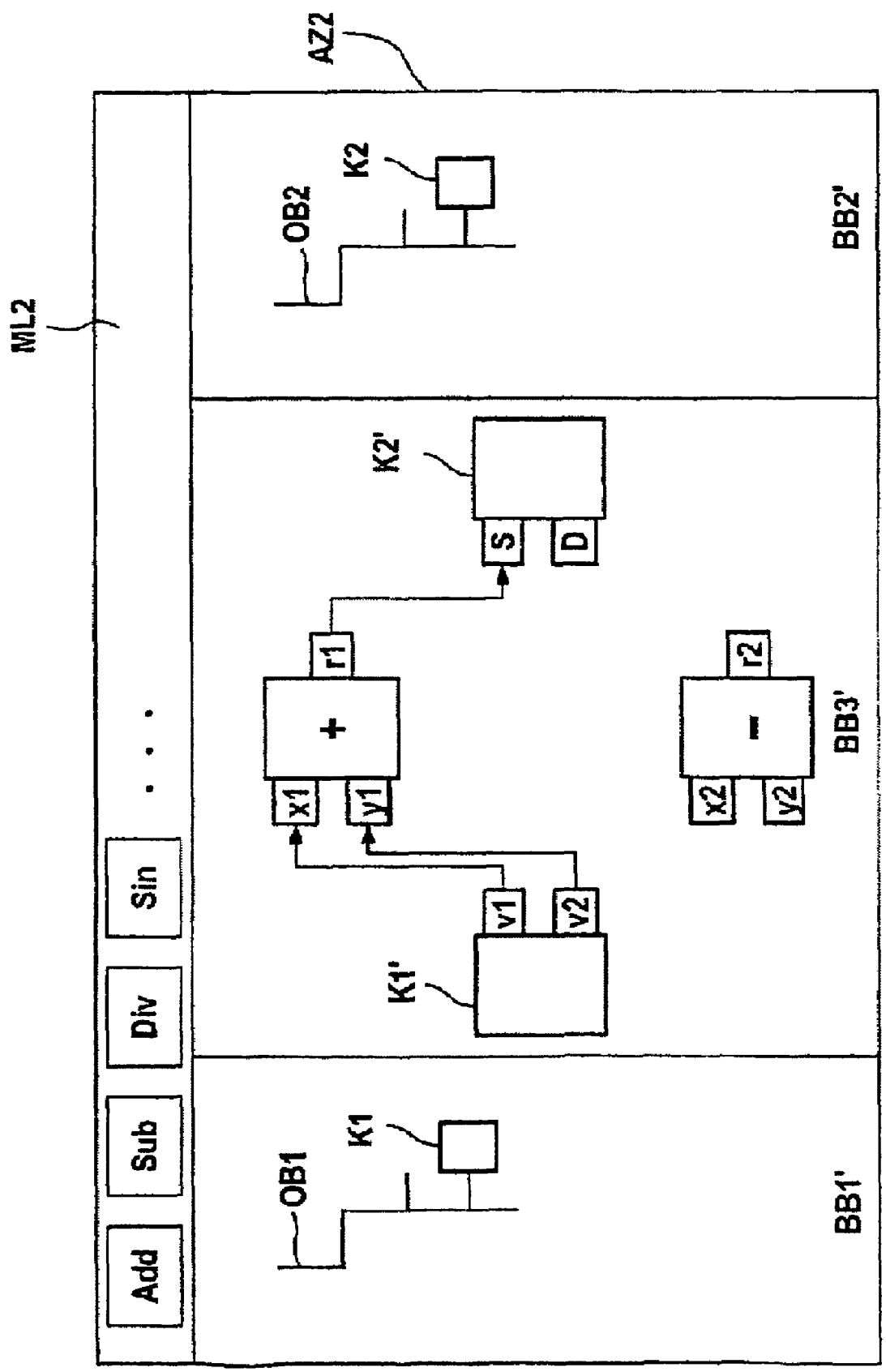

The illustration according to FIG. 5 shows an example of the transformation of objects or object trees with the aid of mathematical objects. The screen areas BB1' and BB2' contain object trees OB1 and OB2, which are to be converted into one another. OB1 contains the component K1 as an element in its structure, while OB2 contains the component K2 as an element in its structure. The components K1 or K2 are moved onto the work area BB3' by means of a drag&drop mechanism, and on the work area BB3' the component K1' corresponds to the component K1 of the object tree OB1 and the component K2' corresponds to the component K2 of the object tree OB2. It is intended to produce a transformation between these components K1' and K2'. K1' contains the variables V1 and V2, and K2' contains the variables S and D. Operators, e.g. Addition, Subtraction, Division, Sine, are represented in the menu bar ML2, and these can be used for defining a transformation. Further mathematical operators can also be provided in order to define a transformation, e.g. Multiplication, Tangent, Arc Tangent, Cosine, Exponential Function, Logarithm, Root Function, Signum, Absolute Function, etc. Furthermore, timers can also be used for the definition of transformations. Timers provide, for example, the current time or also definable timing pulses which can be manipulated e.g. with the aid of the mathematical operations mentioned. Thus, it is possible, for example, to add values that come from a timer to other values and only then pass them on.

A user can, however, also implement self-defined operators or operations by means of scripts or implementation of COM objects. In the screen area BB3' it is shown that the two variables V1 and V2 of the component K1 and K1' are added together. The result of this addition (represented by the variable R1) is linked to the variable S of the component K2' and K2. During the generation of a transformation of this type there is produced a rule object which can also be reused for subsequent transformations. These rule objects can be stored for example in the communication structure of an adapter (see FIG. 7) and used. As a result of the drag&drop-like manner of linking object trees to one another or objects of object trees by the user moving them onto the work area BB3', the connections for the transformation are generated automatically. In other words, this connection is created in the background for the objects to be linked.

Owing to the possibilities of graphical projecting using the drag&drop mechanism, it is no longer necessary for the user to program individual connections. Instead, he or she can project them graphically. This greatly increases a user's efficiency and productivity. Following a transformation, two object trees which are to be linked to each other are present in a common representation. As a result it is very easy to set up a communication which is based on a pure data exchange between these objects, i.e. between the associated applications. The performance of a communication connection of this kind is very high.

Figure 6:
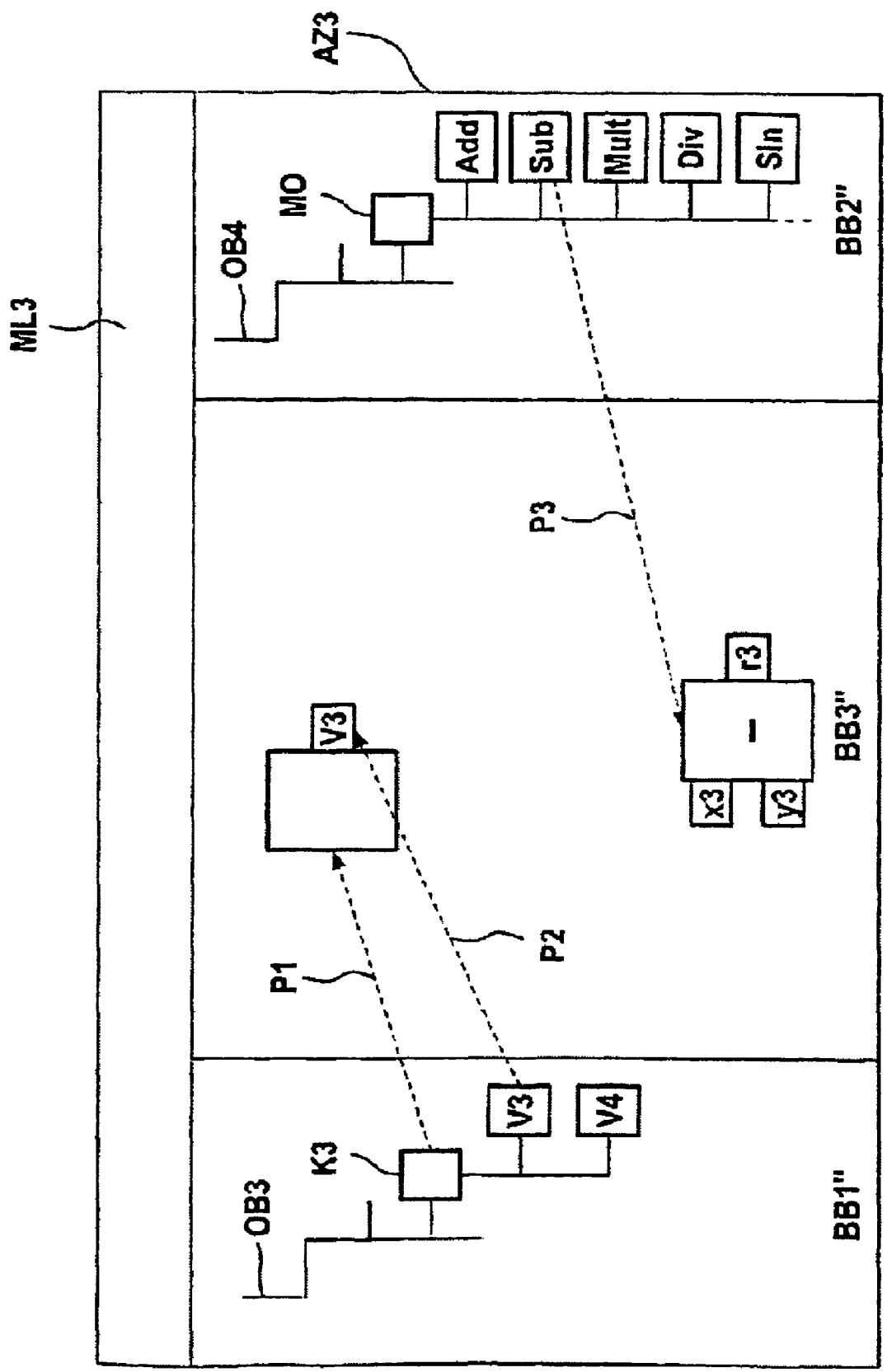

The illustration according to FIG. 6 depicts an example of the projecting of a transformation. FIG 6 shows a display device AZ3 (e.g. display, monitor) comprising the screen areas BB1", BB3", BB2' and the screen area ML3. The object tree OB3 with the component K3 is shown in the screen area BB1". The component K3 contains the variables v3 and v4. The arrows P1 and P2 schematically indicate that the component K3 and the associated variable v3 are dragged onto the screen area BB3" by means of drag&drop. Thus, the screen area BB3" represents a work area (workspace, interface, desktop) in the projecting environment. The screen area BB2" contains the object tree OB4. This object tree OB4 contains a node MO with mathematical objects. These mathematical objects can likewise be moved onto the work area BB3". This is represented schematically by means of the arrow P3. The mathematical object "Subtraction" (Sub) is selected by means of the arrow P3 and moved onto the work area. This mathematical object "Subtraction" contains the input variables x3 and y3 as well as the output variable r3. The variable r3 represents the result of the subtraction. In the diagram according to FIG. 6 it is shown that the node containing the mathematical objects MO can also include the addition, the multiplication, the division, and the sine, as well as the subtraction. However, it is also possible that this node contains further mathematical objects such as arc, arc tangent or mathematical functions defined personally by the user. The user can link the objects to each other on the work area BB3" and in the process establish rules for the transformation of the object trees. It is also conceivable that the mathematical objects for creating the rules are stored in the menu bar ML3. These mathematical objects can then be selected from this menu bar ML3 also via drag&drop or by means of mouse click for the work area BB3'. The menu bar ML3 can also include further functions which can also be defined by the user. The screen areas, as represented in the display device AZ3, can also be disposed in some other arbitrary arrangement. It is also conceivable that further screen areas are displayed or that fewer screen areas are displayed. The inputs for the projecting environment can also be effected using other input aids, e.g. via a keyboard.

Figure 7:
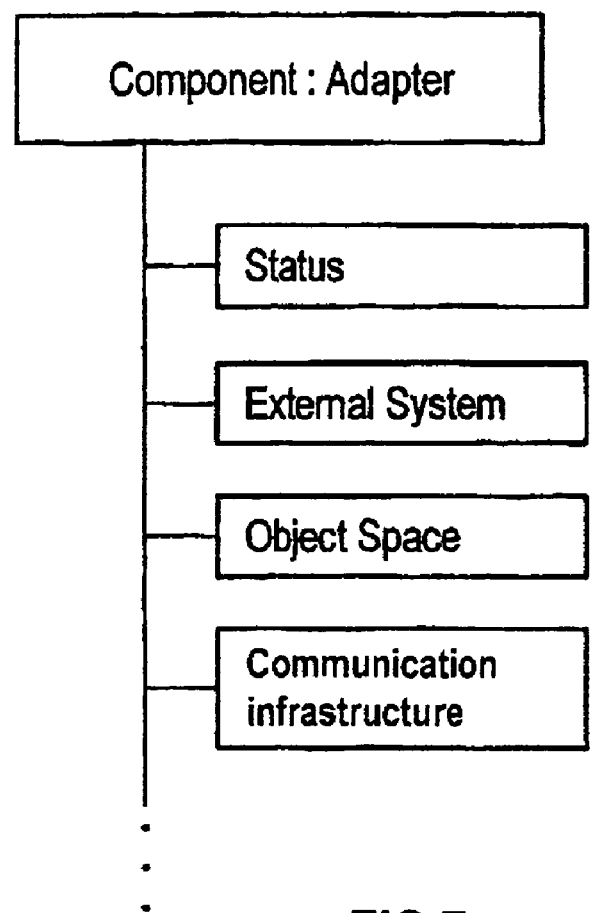

The illustration according to FIG. 7 shows the structure of an adapter in schematic form. Each adapter is a special component with the special characteristic that the component of an adapter runs in a separate process in each case. Each adapter already comes with a specific default structure, which is again represented as a tree structure of objects of the framework program, i.e. components and variables, and which provides certain points at which the adapter can convey specific information externally. Examples of this are status information relating to the status of the adapter (is the adapter linked to its application, is the application running, version information, etc.). An adapter can also issue information on the external system, i.e. the external application, externally. By means of the "object space" an adapter can output structures which can be accessed by other adapters or other applications. An adapter can also output information relating to a communications infrastructure. A communications infrastructure is understood to mean objects for sending messages, receiving messages, and transforming messages. But it also includes mechanisms for performing routing and mechanisms for logging the data exchange of the adapter. The communications infrastructure of an adapter further comprises so-called inports and outports, which physically receive or send the messages. An adapter is present as a separate process of the operating system, i.e. if an adapter crashes, then this has no impact on other adapters. An adapter is therefore a distinct, self-contained application which is executable on its own.

Adapters and wrappers are mechanisms to enable the integration of software components into a software system. A wrapper maps the API (Application Programmable Interface) of a third-party component or an application to be integrated into the object model of the software system, in this case the framework program (IF; FIG. 2). Thus, for example, a method of the API of the application to be integrated is converted into a method of the framework program or an integer data type of the API of the application to be integrated is converted into an integer data type of the framework program, etc. A wrapper thus converts the API of the application to be integrated into the language, the nomenclature and the object environment of the framework program.

An adapter, on the other hand, is an abstraction stage higher than a wrapper. Adapters represent a standardized view onto applications which are to be integrated, and the framework program into which the application to be integrated is mounted can abstract from this application. An adapter provides functionality required to start, operate and handle the system to be integrated, i.e. the application to be integrated. With the aid of adapters, a user can use, for example, a SAP application without being a SAP expert. By means of the IDOC adapters, SAP applications are mapped into the object model of the framework program and are then used as objects of the framework program (Component IDOC).

The system and method according to the invention enables two applications (e.g. MES applications) to be brought into contact with each other on a peer-to-peer basis without the need to program a link of this type as a peer-to-peer connection in each case. These links are projected according to the invention by the establishment of a connection.

The rules used during the transformation can be part of an adapter or the rules can be stored as information on an adapter and imported into the system.

There are, for example, adapters for spreadsheets (e.g. Excel) or other "commercials off the shelf" programs.

Figure 8:
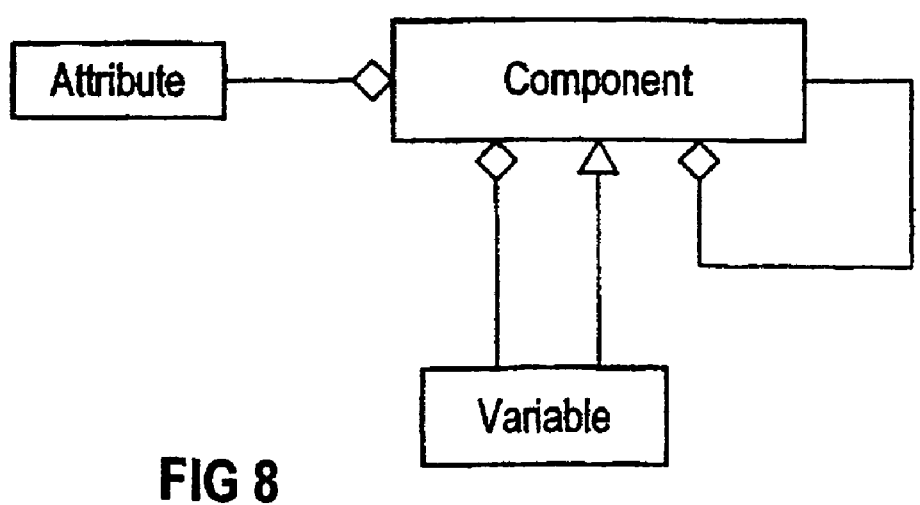

The illustration according to FIG. 8 shows the object structure of a "component" as a meta-object model of the framework program (IF; FIG. 2) in UML (Unified Modeling Language). With the system and method according to the invention, the software applications to be integrated and the underlying means of communication (e.g. HTTP, MSMQ, etc.) are mapped onto an object model of the framework program (IF; FIG. 2). As a result, inherently heterogeneous applications possess a common object model. Consequently, all methods, data structures, objects, etc. of the third-party applications to be integrated are represented in a common object model. This object model is very generic and represents a meta-object model. The core of this object model consists of an object type named "component". A component can, in turn, aggregate other components and/or contain special types of components, known as variables, to which specific values are assigned during operation. Each of the components and variables can also possess additional attributes.

This object model forms the basis for the adaptation of MES applications or other applications. This means that the structures of the applications are translated or mapped into structures of this object model. All the applications to be integrated are represented within the framework program (IF, FIG. 2) in the representation of this object model. The underlying means of communication are also mapped onto this generic object model. All applications and all underlying means of communication are now represented in the framework program (IF; FIG. 2) in a consistent and homogeneous object model. As a result, communication relationships can be set up very simply and easily between the applications.

In the diagram according to FIG. 8, the generic component "Component", which represents the core of the object model, is shown in UML notation.

The rectangular boxes represent parts of the object model. An aggregation (is-part-of relationship) is represented by a diamond relationship, while inheritance (is-a relationship) is represented by a triangle relationship. In the diagram according to FIG. 8, therefore, it is shown that a component can consist of a plurality of components; a component can also be part of another component. By means of the diamond relationship a component is linked to attributes and variables. In other words, a component can contain attributes and variables. Attributes are descriptive data. All objects of a class possess the same attributes, though in general they have different attribute values. An attribute value is a value assigned to an attribute from its value range. A variable can assume values of specific data types (e.g. integer, real, etc.). As indicated by the diamond relationship, a component can contain a plurality of variables. However, a component can also be a superclass of a variable, as represented by the triangle relationship. In other words, a variable can be a derived component. The diamond and triangle relationships can also contain cardinalities.

By means of mapping mechanisms such as adapters or wrappers, for example, the software applications to be integrated and the underlying means of communication are mapped onto this generic object structure, i.e. "Component" structure, of the framework program (IF; FIG. 2).

System and method for projecting the transformation of object trees, in particular in MES systems, wherein the source and target object trees are represented in a common meta-object model of a software system, in particular of a framework. The source object tree is transformed into the target object tree by means of rules. The transformation takes place directly on the objects of the meta-object model (component). This enables communication to be established between coupled applications via a pure data exchange.

The above described system and method according to the invention can be implemented as a computer program in languages known for this purpose. A computer program implemented in this way can be transferred in a likewise known manner via electronic data paths, but also stored and transported on data media.

The invention claimed is:

1. A method for projecting transformations of object trees of a Manufacturing Execution System (MES), comprising:
   representing a source object tree and a target object tree in a common meta-object model of a software system operatively installed on a computer;
   displaying the source object tree on a first screen area of a display device connected to the computer;
   displaying the target object tree on a second screen area of the display device;
   providing a work area on a third screen area of the display device;
   copying representations of selected nodes and selected sub-elements of the selected nodes of both object trees onto the work area; and
   projecting a transformation on the work area by interactively graphically connecting the representations of the selected nodes and selected sub-elements positioned on the work area;
   wherein the copied representations are positioned in the work area such that copied representations of source and target sub-elements are respectively graphically connected without showing crossing lines.

2. The method according to claim 1, further comprising:
   displaying operators and/or rules on a fourth screen area of the display device; and
   positioning selected ones of the operators and/or the rules on the work area.

3. The method according to claim 1, wherein the transformation is performed in the underlying user domain.

4. The method according to claim 2, wherein the rules are represented as objects of the software system.

5. The method according to claim 1, wherein the nodes are positioned and interconnected by input aids using drag&drop.

6. The method according to claim 2, wherein the operators and/or the rules are positioned and interconnected by input aids using drag&drop.

7. The method according to claim 1, wherein further transformation operators and/or rules are defined by a user.

8. The method according to claim 1, wherein the software system is implemented by at least one framework program.

9. The method according to claim 1, wherein the source and target object tree are predefined by the object models of coupled adapters.

10. The method according to claim 1, wherein the method is implemented by a computer program.

11. The method according to claim 1, wherein the method is implemented by a computer program which is stored on a data medium.

12. A Manufacturing Execution System (MES) data processing device comprising a computer program operating a computer for performing a method for projecting transformations of object trees on a display device, the method comprising:
   representing a source object tree and a target object tree in a common meta-object model of a software system;
   displaying the source object tree on a first screen area of the display device;
   displaying the target object tree on a second screen area of the display device;
   providing a work area on a third screen area of the display device;
   copying representations of selected nodes and selected sub-elements of the selected nodes of both object trees onto the work area; and
   projecting a transformation on the work area by interactively graphically connecting the representations of selected nodes and selected sub-elements positioned on the work area;
   wherein the copied representations are positioned in the work area such that copied representations of source and target sub-elements are respectively graphically connected without showing crossing lines.

* * * * *